US011311999B2

(12) United States Patent
Go

(10) Patent No.: US 11,311,999 B2
(45) Date of Patent: Apr. 26, 2022

(54) UP-DOWN WORKTABLE

(71) Applicant: OKO Co.,Ltd., Gwangju (KR)

(72) Inventor: Byeong Ki Go, Gwangju (KR)

(73) Assignee: OKO Co., Ltd., Gwangju (KR)

( * ) Notice: Subject to any disclaimer, the term of this patent is extended or adjusted under 35 U.S.C. 154(b) by 0 days.

(21) Appl. No.: 17/117,068

(22) Filed: Dec. 9, 2020

(65) Prior Publication Data

US 2022/0040841 A1 Feb. 10, 2022

(30) Foreign Application Priority Data

Aug. 6, 2020 (KR) .................. 10-2020-0098750

(51) Int. Cl.
*B25H 1/02* (2006.01)

(52) U.S. Cl.
CPC ..................... *B25H 1/02* (2013.01)

(58) Field of Classification Search
CPC .......... B66F 7/0625; B66F 7/065; B66F 7/08; B66F 7/28; B66F 3/46; B66F 7/06; B66F 7/22; B66F 9/06; B62B 1/12; B62B 2203/07; B62B 2203/10; B62B 2203/21; B62B 3/06; B62B 3/08
USPC .......... 269/17, 16, 134–136; 254/133 R, 134
See application file for complete search history.

(56) References Cited

U.S. PATENT DOCUMENTS

| | | | | |
|---|---|---|---|---|
| 6,135,466 A * | 10/2000 | Irwin | ....................... | B62B 1/12 |
| | | | | 280/47.19 |
| 7,165,776 B2 * | 1/2007 | Quinlan, Jr. | .......... | B66F 7/0625 |
| | | | | 211/207 |
| 9,233,699 B2 * | 1/2016 | Murphy | .................... | B62B 1/04 |
| 9,945,134 B2 * | 4/2018 | Go | ............................ | E04G 1/20 |
| 9,988,172 B2 * | 6/2018 | Ristoski | .................... | B62B 1/12 |
| 10,246,315 B2 * | 4/2019 | Combs | .................... | B66F 9/075 |
| 2005/0110232 A1 * | 5/2005 | DiBenedetto | ........ | B62B 3/0637 |
| | | | | 280/47.29 |

FOREIGN PATENT DOCUMENTS

KR 10-0619877 B1 9/2006
KR 10-2020-0053956 A 5/2020

OTHER PUBLICATIONS

Office Action issued in KR 10-2020-0098750; mailed by the Korean Intellectual Property Office dated Nov. 6, 2020.

* cited by examiner

*Primary Examiner* — Lee D Wilson
*Assistant Examiner* — Robert F Neibaur
(74) *Attorney, Agent, or Firm* — Studebaker & Brackett PC

(57) ABSTRACT

Disclosed is an up-down worktable including a base frame, a lifting member installed on the base frame to be vertically slidable, a work support having one side surface provided with a mounting surface to allow an object to be transferred to be mounted thereon and having an end pivotably installed on the lifting member, a lift support portion installed on the base frame to move the lifting member upward while elastically supporting the lifting member to allow the lifting member to move downward according to a load of the object mounted on the mounting surface, and an angle restriction portion configured to restrict a pivoting angle of the work support so that the mounting surface is set in a direction of intersecting with a sliding direction of the lifting member to mount the object on the mounting surface or the work support stands straight with respect to the base frame.

9 Claims, 15 Drawing Sheets

UP-DOWN WORKTABLE

CROSS-REFERENCE TO RELATED APPLICATION

This application claims priority to and the benefit of Korean Patent Application No. 10-2020-0098750, filed on Aug. 6, 2020, the disclosure of which is incorporated herein by reference in its entirety.

BACKGROUND

1. Field of the Invention

The present invention relates to an up-down worktable, and more particularly, to an up-down worktable in which a work support automatically moves downward or upward depending on loading or unloading of an object to be transferred so as to allow a worker to keep working at a uniform height.

2. Discussion of Related Art

Generally, worktables are configured to allow a variety of tools, materials, or the like, which are necessary for a work process, to be placed thereon and classified as fixed worktables with a fixed plate on which tools, materials, or the like are placed and up-down worktables which move up or down due to an additional lift device.

Among them, an up-down worktable is configured to adjust a height by moving a plate up or down as necessary and has a link structure in which a plurality of lateral link bars and a plurality of perpendicular link bars are connected by a variety of joints.

In more detail, a conventional up-down worktable includes a base frame, a mount frame including a plate on which tools, materials, or the like are placed, and a lifting link structure configured to move the mount frame up or down. In the conventional up-down worktable, the mount frame moves up or down due to vertical extension or contraction of the link structure so that a height is adjusted.

However, since the above conventional up-down worktable has a complicated structure overall due to the link structure configured to move the mount frame up or down, a malfunction or an error may be caused. When a load of materials placed thereon is relatively high, it is difficult to stably support the load and to precisely adjust a height thereof.

Although a variety of up-down worktables have been developed to overcome above limitations, in all conventional up-down worktables, a lift height is adjusted by a worker using a pump, an electric motor, or another actuator as necessary. When it is necessary to frequently change the height of the worktable, a time consumed in adjusting the height of the worktable increases such that work efficiency decreases.

RELATED ART DOCUMENT

Patent Document

Patent Document 1: Korean Patent Registration No. 10-0619877 titled Manual driving type work table

SUMMARY OF THE INVENTION

The present invention is directed to providing an up-down worktable configured to automatically move downward according to a load of an object which is loaded thereon to be transferred so as to improve work efficiency.

According to an aspect of the present invention, there is provided an up-down worktable including a base frame, a lifting member installed on the base frame to be vertically slidable, a work support having one side surface provided with a mounting surface to allow an object to be transferred to be mounted thereon and having an end pivotably installed on the lifting member, a lift support portion installed on the base frame to move the lifting member upward while elastically supporting the lifting member to allow the lifting member to move downward according to a load of the object mounted on the mounting surface, and an angle restriction portion configured to restrict a pivoting angle of the work support so that the mounting surface is set in a direction of intersecting with a sliding direction of the lifting member to mount the object on the mounting surface or so that the work support stands straight with respect to the base frame.

The lift support portion may include one or more elastic members having both ends installed on the lifting member and the base frame and configured to provide an elastic force to the lifting member to allow the lifting member to move upward.

The elastic member may include a coil wound spirally a plurality of times to form a hollow in a center thereof on the basis of a center of the hollow, and a plurality of connection members provided on both ends of the coil to fix the both ends to the base frame and the lifting member. Also, the coil may be formed to have a quadrangular section.

The connection members may each include an insertion body inserted into the hollow of the coil, fixed to an inner circumferential surface of the coil and having an outer circumferential surface on which an insertion protrusion spirally protruding to be introduced between the coil wound spirally is formed, a restriction rod formed to extend and protrude from the insertion body toward the outside of the coil, and a restriction body configured to restrict an end of the restriction rod to the base frame or the lifting member.

The lift support portion may include an incline guide member installed on the base frame 200 to be tilted at a certain angle with respect to a sliding path of the lifting member, a lifting roller formed to be vertically movable along the incline guide member and installed on the lifting member to be slidable in a direction of intersecting with an extension direction of the incline guide member, and an elastic member installed on the lifting roller and configured to provide an elastic force along a sliding direction of the lifting roller with respect to the lifting member to allow the lifting roller to move upward along the incline guide member. Here, the elastic member may include a coil wound spirally a plurality of times to form a hollow in a center thereof on the basis of a center of the hollow and a plurality of connection members provided on both ends of the coil to fix the both ends to the lifting roller and the lifting member. The coil may be formed to have a quadrangular section. The connection members may each include an insertion body inserted into the hollow of the coil, fixed to an inner circumferential surface of the coil, and having an outer circumferential surface on which an insertion protrusion spirally protruding to be introduced between the coil wound spirally is formed, a restriction rod extending and protruding from the insertion body toward the outside of the coil, and a restriction body configured to restrict an end of the restriction rod to the lifting roller or the lifting member.

The work support may include a monitoring hole formed to pass therethrough so as to allow a worker behind the work support to see a front side of the work support while the work support stands straight with respect to the base frame.

The work support may include a bracket installed on the lifting member, a pivoting shaft formed on one end of the bracket, a pivoting frame extending in a direction away from the bracket and including a pivoting hole into which the pivoting shaft is inserted so that an end thereof is pivotably coupled to the bracket, and a support plate installed on the pivoting frame and provided with the mounting surface on one side surface thereof. Here, the pivoting frame may include a first interference surface formed to extend along an extension direction of the pivoting frame and a second interference surface extending in a direction of intersecting with the first interference surface while a corner part between the first interference surface and the second interference surface is formed to be curved. The pivoting hole may extend to a certain length along the extension direction of the pivoting frame. The angle restriction portion may include one or more interference blocks formed on respective brackets at positions spaced at a certain distance apart from the pivoting shaft toward the other ends of the brackets so as to interfere with the first interference surface or the second interference surface of the pivoting frame and restrict pivoting of the pivoting frame.

The base frame may include a transfer portion including a plurality of transfer wheels on a bottom thereof, a support tower portion extending upward from the transfer portion with a certain length, on which the lifting member is installed to be vertically slidable, and in front of which the work support is provided, a handle provided on the support tower portion to allow a worker to grip and move the transfer portion, and a holding ring installed on a rear side of the support tower portion and configured to hold a transfer box included in the object.

The support plate may include a support body having one side surface fixed to the pivoting frame, having an internal space formed therein, and having an open other surface, a support cover installed on the support body to cover the other surface of the support body and provided with the mounting surface on which transfer goods are mounted, and a reinforcing portion provided in the support body to reinforce the support body and the support cover. Also, the support body may include a plurality of protruding portions formed on an inner surface opposite the support cover to protrude toward the support cover.

The reinforcing portion may further include at least one coupling protrusion formed on the facing support cover between the protruding portions to protrude toward the support body, an insertion body formed on the support body facing the coupling protrusion and including an insertion hole at an end to allow an end of the coupling protrusion to be inserted therein, a restriction protrusion formed to protrude from an inner surface of the insertion hole at a position receding to a certain depth from the end of the insertion body so as to restrict an insertion depth of the coupling protrusion with respect to the insertion hole, and a support protrusion formed on the protruding portion facing the support cover to protrude toward the support cover to support the support cover so as to prevent the support cover from being deformed by a load of the object mounted on the mounting surface.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
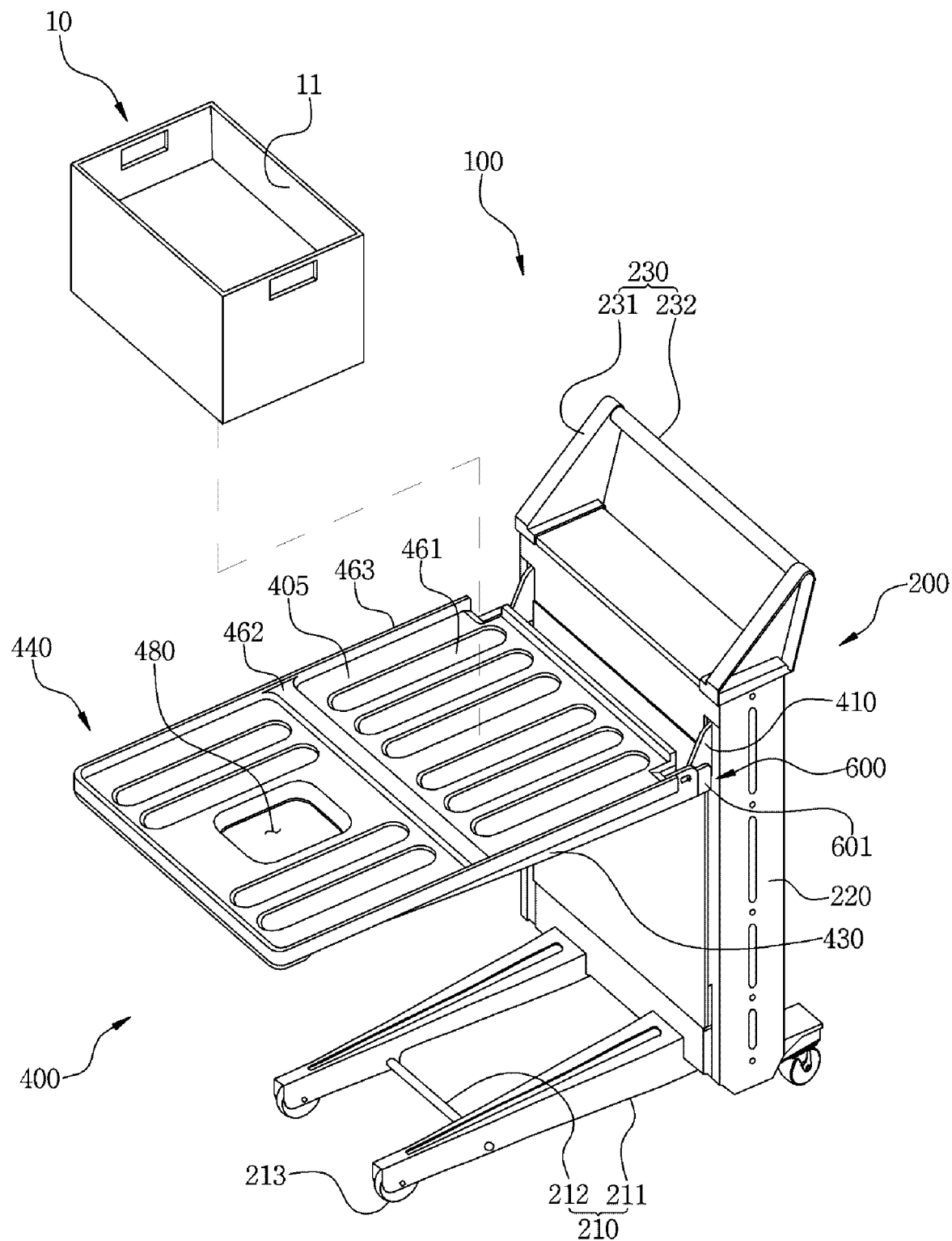
FIG. 1 is a perspective view of an up-down worktable according to the present invention.

Hereinafter, an up-down worktable according to an embodiment of the present invention will be described in detail with reference to the attached drawings. Since the present invention may be variously modified and have a variety of forms, particular embodiments will be illustrated in the drawings and described in detail in the text. However, these are not intended to limit the present invention to a particularly disclosed form and it should be understood that the present invention includes all changes, equivalents, and substitutes included within the concept and technical scope of the present invention. In a description of each drawing, like elements will be referred to as like reference numerals. In the attached drawings, for clarity of the present invention, sizes of structures are exaggerated than they are.

The terms such as first, second, and the like may be used to describe a variety of components, and the components are not limited to the terms. The terms are used only for distinguishing one component from another. For example, without departing from the scope of the present invention, a first component may be referred to as a second component, and similarly, the second component may be referred to as the first component.

The terms used herein are used merely for describing particular embodiments and are not intended to limit the present invention. Singular expressions, unless clearly defined otherwise in context, include plural expressions. Throughout the application, the terms "comprise," "have," or the like are used herein to specify the presence of stated features, numbers, stages, operations, elements, components or combinations thereof but do not preclude the presence or addition of one or more other features, numbers, stages, operations, elements, components, or combinations thereof.

Unless otherwise defined, all terms used herein including technical or scientific terms have the same meanings as those generally understood by one of ordinary skill in the art. The terms as defined in generally used dictionaries should be understood as having meanings which coincide with contextual meanings of related art and will not be understood as ideal or excessively formal meanings unless clearly defined in the present application.

FIGS. 1 to 7 illustrate an up-down worktable 100 according to the present invention.

Referring to the drawings, the up-down worktable 100 includes a base frame 200, a lifting member 300 installed on the base frame 200 to be vertically slidable, a work support 400 including a mounting surface 405 formed on one side thereof to allow an object 10 to be transferred (hereinafter, referred to as the object 10) to be mounted thereon and having an end pivotably installed on the lifting member 300, a lift support portion 500 installed on the base frame 200 to lift the lifting member 300 and to elastically support the lifting member 300 to be moved downward according to a load of the object 10 mounted on the mounting surface 405, and an angle restriction portion 600 configured to restrict a pivoting angle of the work support 400 to set the mounting surface 405 in a direction of intersecting with a sliding direction of the lifting member 300 or to allow the work support 400 to stand upright with respect to the base frame 200 so as to mount the object 10 on the mounting surface 405.

The base frame 200 includes a transfer portion 210 including a plurality of transfer wheels 213 on a bottom thereof, a support tower portion 220 extending upward from the transfer portion 210 with a certain length and on which the lifting member 300 is installed to be vertically slidable and in front of which the work support 400 is provided, a handle 230 provided on the support tower portion 220 to allow a worker to grip and move the transfer portion 210, and a holding ring 240 installed on a rear side of the support tower portion 220 and configured to hold a transfer box 11 included in the object 10.

The transfer portion 210 includes extension rods 211 extending in a front-rear direction with a certain length and spacing rods 212 extending in a left-right direction and having both ends connected to the extension rods 211 to support the extension rods 211 to be spaced apart along a left-right direction. The transfer wheels 213 are installed on a bottom surface of the extension rod 211 to be spaced apart along a front-rear direction.

The support tower portion 220 is installed behind the extension rods 211 and extends upward from the extension rods 211 with a certain length. The support tower portion 220 includes an installation space 221 to allow the lifting member 300 and the lift support portion 500 to be installed therein. Also, movement rails 222 are installed on left and right inner wall surfaces of the support tower portion 220 to allow the lifting member 300 to be supported and moved thereon. The movement rails 222 may extend vertically with a certain length.

Also, the support tower portion 220 includes a plurality of through slots on left and right edges of a front surface to allow a bracket 410 of the work support 400 which will be described below to pass therethrough. The through slots pass through the front surface of the support tower portion 220 in a front-rear direction while extending vertically with a certain length so that top ends thereof are adjacent to a top surface of the support tower portion 220 and bottom ends thereof are adjacent to the extending rods 211.

The handle 230 includes a plurality of fixing members 231 provided on the top surface of the support tower portion 220 that are installed to be spaced apart from each other in a left-right direction and extend upward from the support tower portion 220 with a certain length and include a grip member 232 having both ends to be fixed to the fixing members 231. Meanwhile, the handle 230 is not limited to the illustrated example, and any grip device which can be gripped by a worker to move the base frame 200 will be applicable.

The holding ring 240 is installed on a rear surface of the support tower portion 220 and holds the transfer box 11 included in the object 10. The holding ring 240 is formed at a position spaced downward apart from the top surface of the support tower portion 220 at a certain distance and extends backward from the support tower portion 220 with a certain length while an end thereof is formed to be bent upward.

Here, the object 10 includes the transfer box 11 and transfer goods accommodated in the transfer box 11. The transfer box 11 which accommodates the transfer goods is transferred while being mounted on the work support 400. The transfer goods are transferred from the transfer box 11 to another accommodation space. The empty transfer box 11 is held by the corresponding holding ring 240. Here, the transfer box 11 is provided with an accommodation space to accommodate the transfer goods therein, is formed to have an open top, and includes grip grooves formed to pass through left and right side surfaces to be gripped by the worker. The worker may insert the corresponding holding ring 240 into the grip grooves of the transfer box 11 without accommodated transfer goods so as to place the corresponding transfer box 11 on the holding ring 240.

The lifting member 300 is installed in the installation space 221 of the support tower portion 220 to be vertically slidable. The lifting member 300 includes a plurality of support rollers rotatably installed on left and right side surfaces to come into contact with the movement rails 222 to be movable along the movement rails 222. Also, the lifting member 300 is provided with a work space 301 therein to allow the lift support portion 500 to be installed and has open top and bottom parts.

The work support 400 includes the bracket 410 installed on the lifting member 300, a pivoting shaft 420 formed on one end of the bracket 410, a pivoting frame 430 extending in a direction away from the bracket 410 and including a pivoting hole 431 into which the pivoting shaft 420 is inserted so that an end thereof is pivotably coupled to the bracket 410, and a support plate 440 installed on the pivoting frame 430 and provided with the mounting surface 405 on one side surface thereof.

A plurality of such brackets 410 are installed on left and right edges of a front surface of the lifting member 300, and front ends thereof are formed to protrude forward from the support tower portion 220 through the through slots. A plurality of such pivoting shafts 420 are installed on the front ends of the brackets 410. The pivoting shaft 420 is formed to extend with a certain length along a left-right direction with respect to the bracket 410.

A plurality of such pivoting frames 430 are installed on the brackets 410 to be vertically pivotable through the pivoting shafts 420. The pivoting hole 431 is formed on one end of the pivoting frame 430 and the pivoting shaft 420 is inserted therein, and the pivoting frame 430 extends with a certain length in a direction away from the bracket 410.

Here, the pivoting frame 430 includes a first interference surface 432 formed on the one end to extend along an extension direction of the pivoting frame 430. That is, the first interference surface 432 is formed on a top surface of a rear end of the pivoting frame 430 on the basis of FIG. 1. Also, the pivoting frame 430 includes a second interference surface 433 on the one end, which extends in a direction of intersecting with, that is, being perpendicular to, the first interference surface 432. Here, the second interference surface 433 is formed on the rear surface of the pivoting frame 430 on the basis of FIG. 1. Also, the pivoting frame 430 is formed so that a corner part between the first interference surface 432 and the second interference surface 433 does not interfere with the angle restriction portion 600 which will be described below while pivoting. That is, on the basis of FIG. 1, a top corner of the rear end of the pivoting frame 430 may be formed to be curved. Also, the pivoting hole 431 extends with a certain length along the extension direction of the pivoting frame 430. Also, the pivoting hole 431 may be formed at a position spaced at the same distance apart from the first interference surface 432 and the second interference surface 433.

The support plate 440 includes a support body 450 having one side surface fixed to the pivoting frame 430, including an internal space 451 formed therein, and having an open other surface, a support cover 460 installed in the support body 450 to cover the other surface of the support body 450 and provided with the mounting surface 405 on which the transfer goods are mounted, and a reinforcing portion 470 provided in the support body 450 to reinforce the support body 450 and the support cover 460.

The support body 450 extends with a certain length along the extension direction of the pivoting frame 430 and has one side surface fixed to the pivoting frame 430. Here, the support body 450 is formed to have a width greater than a spacing distance of the pivoting frame 430 and may extend longer than a length of the pivoting frame 430.

Meanwhile, the support body 450 includes a plurality of protruding portions 452 protruding from an inner surface opposite the support cover 460 toward the support cover 460. The protruding portions 452 are formed to be spaced apart along the extension direction of the pivoting frames 430 and extend with a certain length in a left-right direction. That is, on the basis of FIG. 1, the protruding portions 452 may be formed to protrude upward from a bottom surface of the support body 450. A structural strength of the support body 450 may be improved by the plurality of protruding portions 452 so as to firmly maintain a shape thereof even when the object 10 which is heavy is supported by the work support 400.

The support cover 460 is formed to have an area corresponding to the support body 450 and is installed on the support body 450 to cover the open other surface of the support body 450. The support cover 460 includes a plurality of reinforcing grooves 461 in an outer perimetrical surface. The plurality of reinforcing grooves 461 recede inward from the outer perimetrical surface of the support cover 460 at a certain depth and extend along the extension direction of the pivoting frame 430 while being spaced apart along a left-right direction.

Meanwhile, the support cover 460 includes a separation-preventing step 463 protruding outward along an outer perimetrical edge to prevent the object 10 mounted on the outer perimetrical surface, that is, the mounting surface 405 from being separated outward. Also, the support cover 460 includes a dividing protrusion 462 formed in a middle part of the outer perimetrical surface. The dividing protrusion 462 protrudes outward from the outer perimetrical surface of the support cover 460 and extends with a certain length along a left-right direction. The dividing protrusion 462 may divide the mounting surface 405 of the outer perimetrical surface of the support cover 460 so as to arrange a plurality of such objects 10 to be parallel.

The reinforcing portion 470 includes a plurality of coupling units 471 installed on the support body 450 and the support cover 460 and a plurality of support protrusions 479 formed on the protruding portion 452 of the support body 450.

The coupling units 471 include a plurality of coupling protrusions 472 formed on the support cover 460 between the protruding portions 452 to face each other and protrude toward the support body 450, a plurality of binding bodies 473 formed on the support body 450 to face the coupling protrusions 472 and include an insertion hole 475 at an end to allow an end of the coupling protrusion 472 to be inserted therein, and a restriction protrusion 474 formed to protrude from an inner surface of the insertion hole 475 at a position receding to a certain depth from the end of the binding body 473 so as to restrict an insertion depth of the coupling protrusion 472 into the insertion hole 475.

The coupling protrusion 472 has a cylindrical shape extending with a certain length from the support cover 460 toward the support body 450. The binding body 473 extends from an inner surface of the support body 450 toward the support cover 460 and includes the insertion hole 475 at the end. The insertion hole 475 may be formed to have an inner diameter corresponding to an outer diameter of the coupling protrusion 472.

The restriction protrusion 474 protrudes from an inner surface of the binding body 473 toward a center of the insertion hole 475 and extends from the inner surface of the binding body 473 in a circumferential direction. The restriction protrusion 474 interferes with the end of the coupling protrusion 472 inserted into the insertion hole 475 and restricts the insertion depth of the coupling protrusion 472.

The coupling unit 471 is formed by coupling the coupling protrusion 472 to the binding body 473 to provide a binding force of the support cover 460 to the support body 450 and supports the support cover 460 against the support body 450 so as to prevent the support cover 460 or the support body 450 from being deformed due to a load of the object 10.

The plurality of support protrusions 479 are formed on the protruding portions 452 opposite to the support cover 460 and protrude toward the support cover 460 and support the support cover 460 to prevent the support cover 460 from being deformed due to the load of the object 10 mounted on the mounting surface 405. The support protrusion 479 may be formed to have a ring shape extending in a left-right direction. The support protrusions 479 support a bottom surface of the support cover 460 and prevent the support cover 460 from being deformed.

Meanwhile, the support plate 440 configured as described above may include a monitoring hole 480 formed to pass therethrough to allow a worker located behind the work support 400 to see a front side of the work support 400 while the support plate 440 stands straight with respect to the base frame 200.

The lift support portion 500 includes an elastic member 510 having both ends installed on the lifting member 300 and the base frame 200, respectively, and configured to provide an elastic force to the lifting member 300 to move the lifting member 300 upward.

The elastic member 510 is fixed to the corresponding lifting member 300 while a top end is fixed to a ceiling surface of the support tower portion 220 and a bottom end recedes into the lifting member 300. The elastic member 510 includes a coil 511 wound spirally a plurality of times to form a hollow in a center thereof on the basis of a center of the hollow and a plurality of connection members 512 provided on both ends of the coil 511 to fix the both ends to the base frame 200 and the lifting member 300.

A tension spring configured to be compressed when the lifting member 300 is located above the support tower portion 220 and to vertically extend due to the load of the object 10 when the corresponding object 10 is mounted on the work support 400 is applied to the coil 511. Accordingly, the coil 511 may be formed to have a quadrangular section which is relatively short while compressed.

The connection members 512 are installed on a top end and a bottom end of the coil 511 and fixed to a ceiling surface of the base frame 200 and a bottom end of the lifting member 300 so as to restrict both ends of the coil 511 to the base frame 200 and the lifting member 300.

Figure 2:
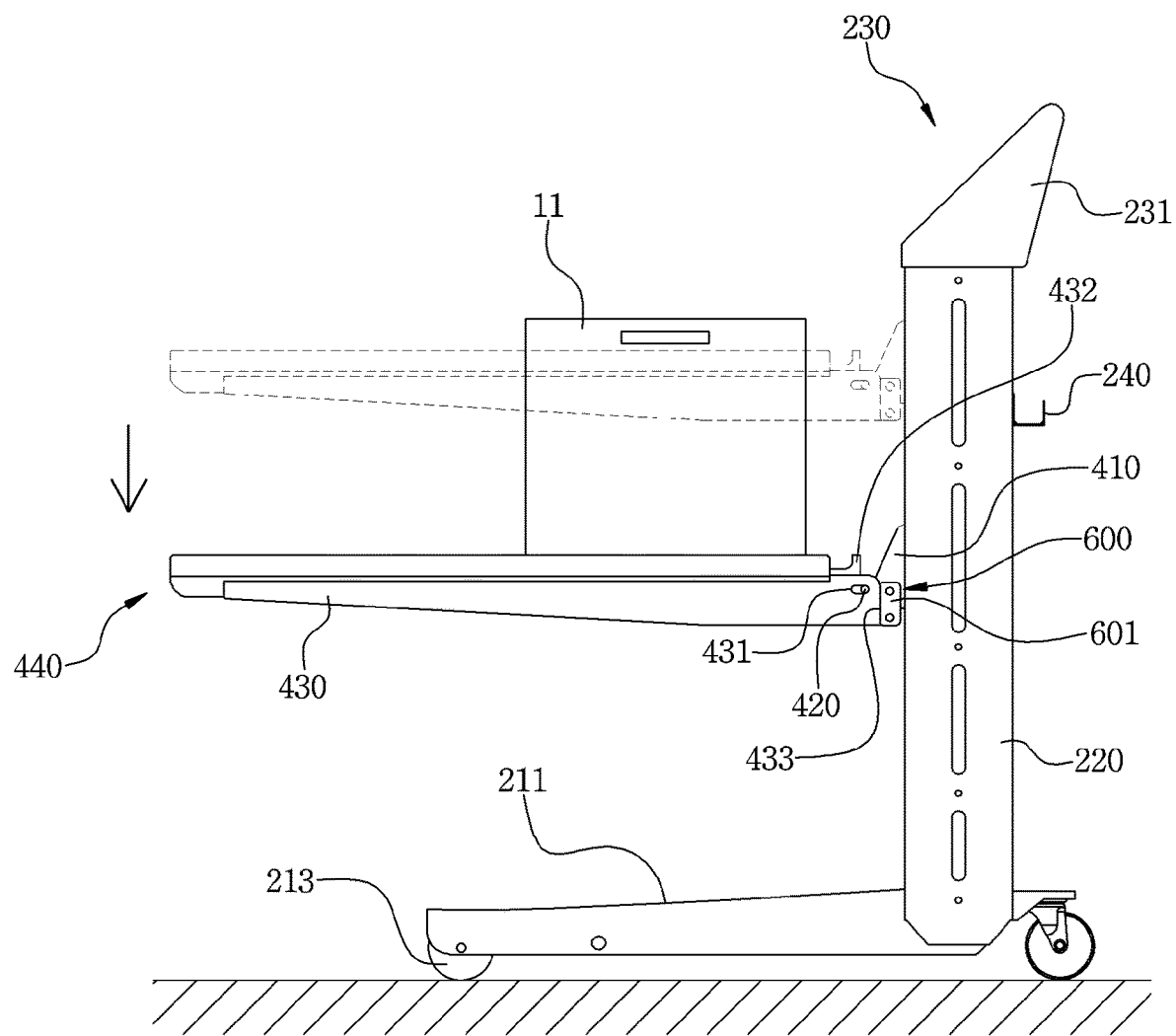
FIG. 2 is a view illustrating an operational state with respect to the up-down worktable of FIG. 1.
Figure 3:
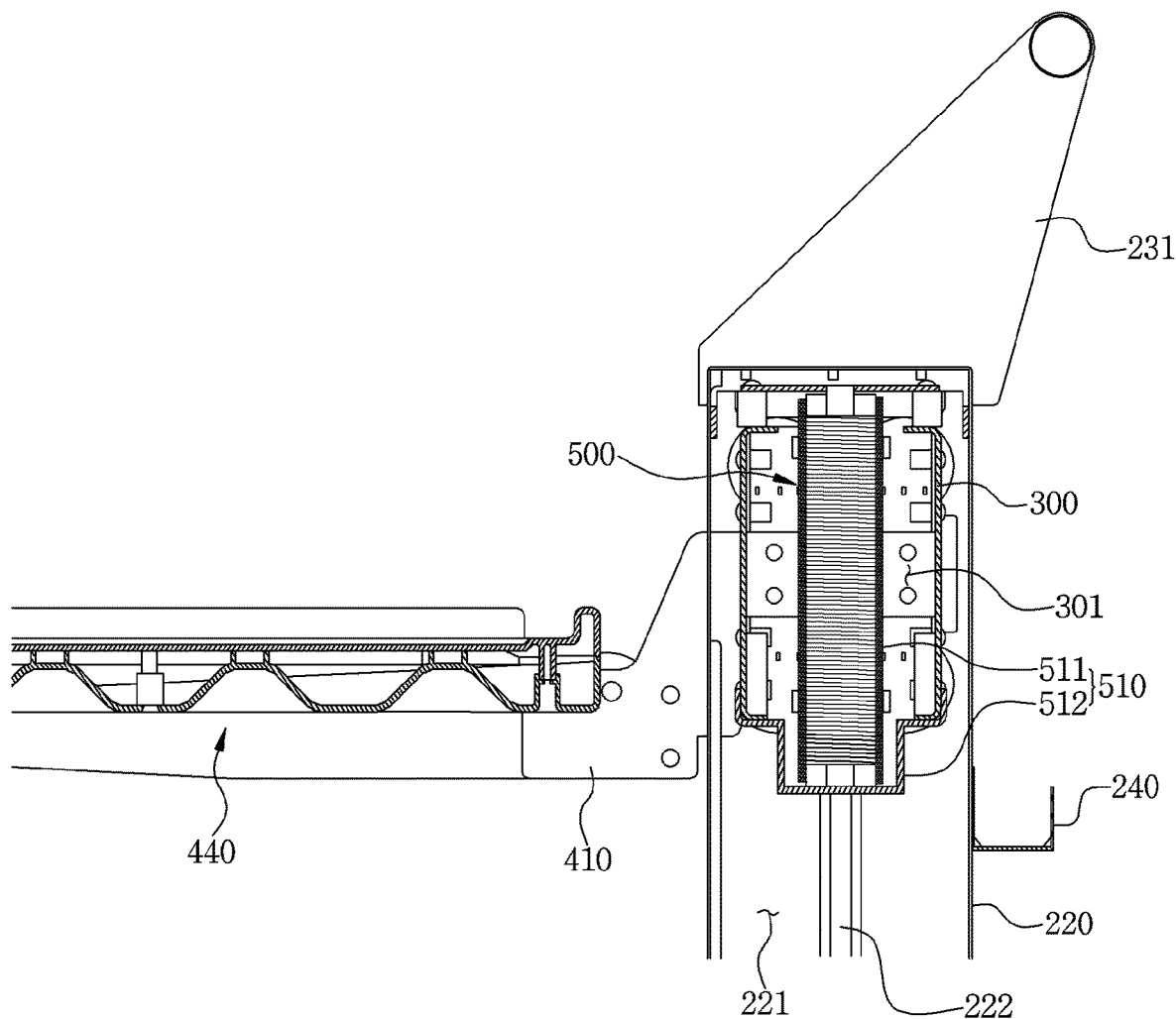
FIGS. 3 and 4 are cross-sectional views of the up-down worktable of FIG. 1.
Figure 4:
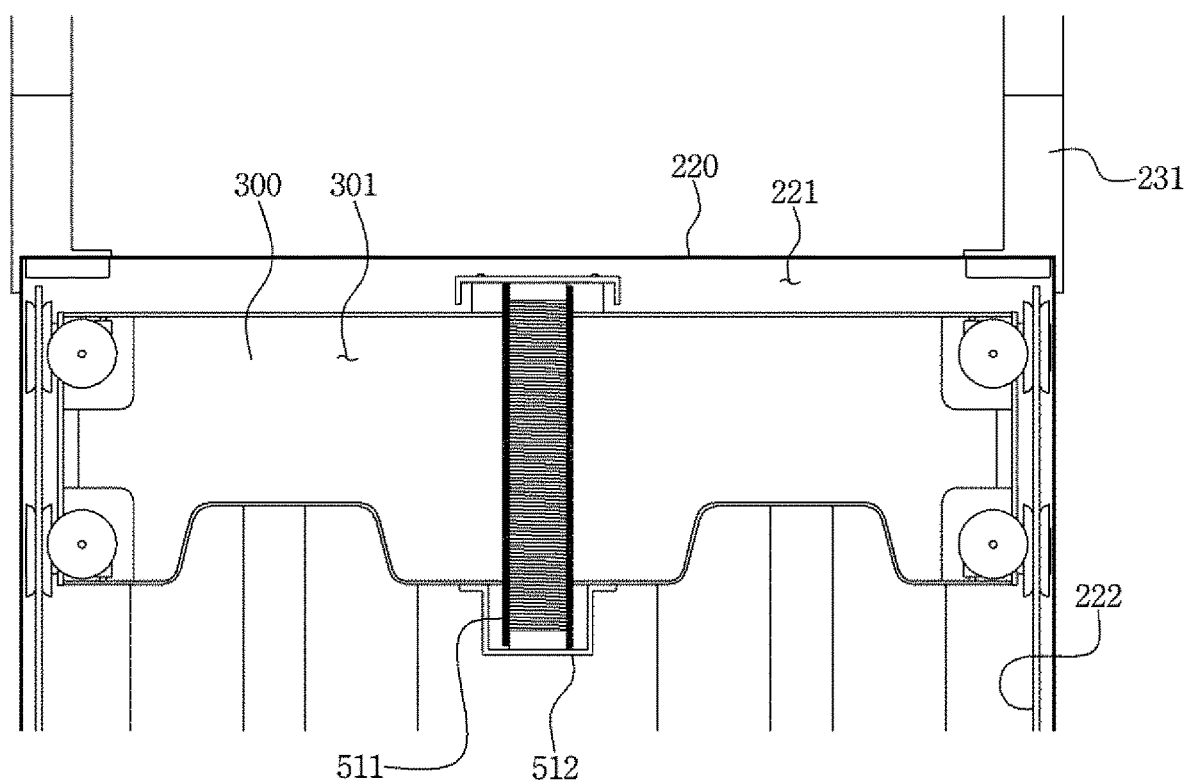

Referring to FIG. 2, when the object 10 is mounted on the work support, the coil 511 extends and the work support moves downward due to the load of the object 10. Here, since the work support automatically moves downward according to the load of the object 10 due to elasticity of the coil 511, a worker keeps working at a uniform height so as to improve work efficiency.

Meanwhile, although a structure in which one elastic member 510 is installed on the lifting member 300 is shown as example, the elastic member 510 is not limited thereto and two or more elastic members may be provided on the lifting member according to a size of the lifting member 300 or a type of the object 10.

The angle restriction portion 600 includes a plurality of interference blocks 601 formed on the respective brackets 410 at positions spaced at a certain distance apart from the pivoting shaft 420 toward the other ends of the brackets 410 so as to interfere with the first interference surface 432 or the second interference surface 433 of the pivoting frame 430 and restrict pivoting of the pivoting frame 430.

The interference block 601 is formed in a quadrangular structure which protrudes from the bracket 410 at a position spaced rearward from the pivoting shaft 420 and vertically extends with a certain length. Here, the interference blocks 601 may be spaced apart from the pivoting shaft 420 at a distance corresponding to a distance between the pivoting hole 431 and the first interference surface 432 so that front surfaces may interfere with the first interference surface 432 and the second interference surface 433.

When the object 10 is mounted on the work support, the work support is located so that the mounting surface 405 faces upward. Here, since the second interference surface 433 interferes with the interference block 601 so that pivoting of the pivoting frame 430 is restricted, the work support maintains a state set in a direction in which the mounting surface 405 intersects with a sliding direction of the lifting member 300.

Figure 5:
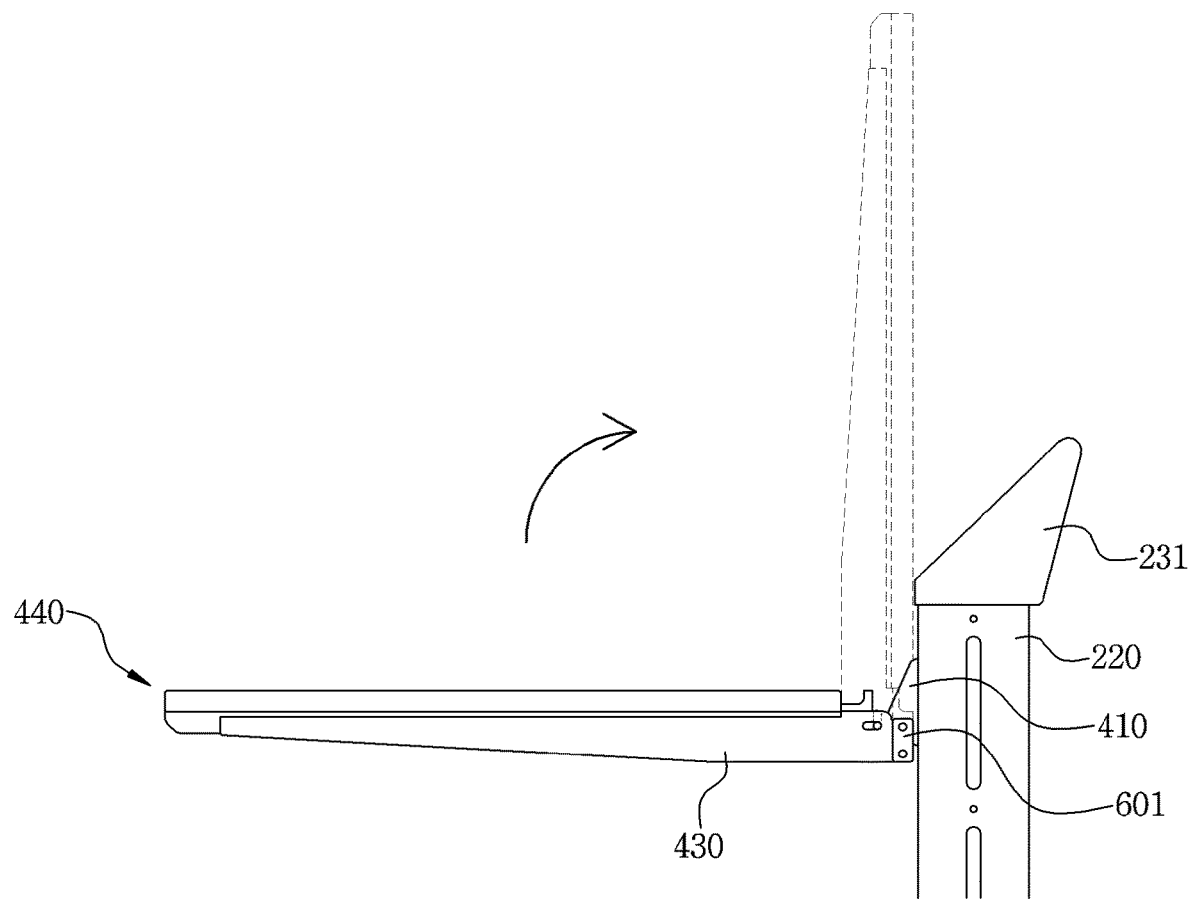
FIGS. 5 and 6 are views illustrating a pivoting state of a work support of the up-down worktable of FIG. 1.
Figure 6:
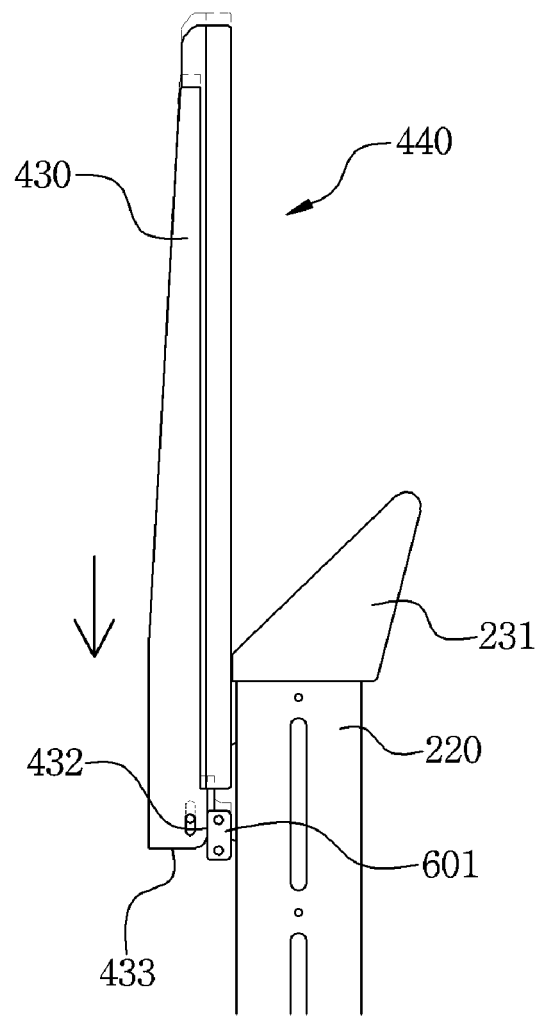
Figure 7:
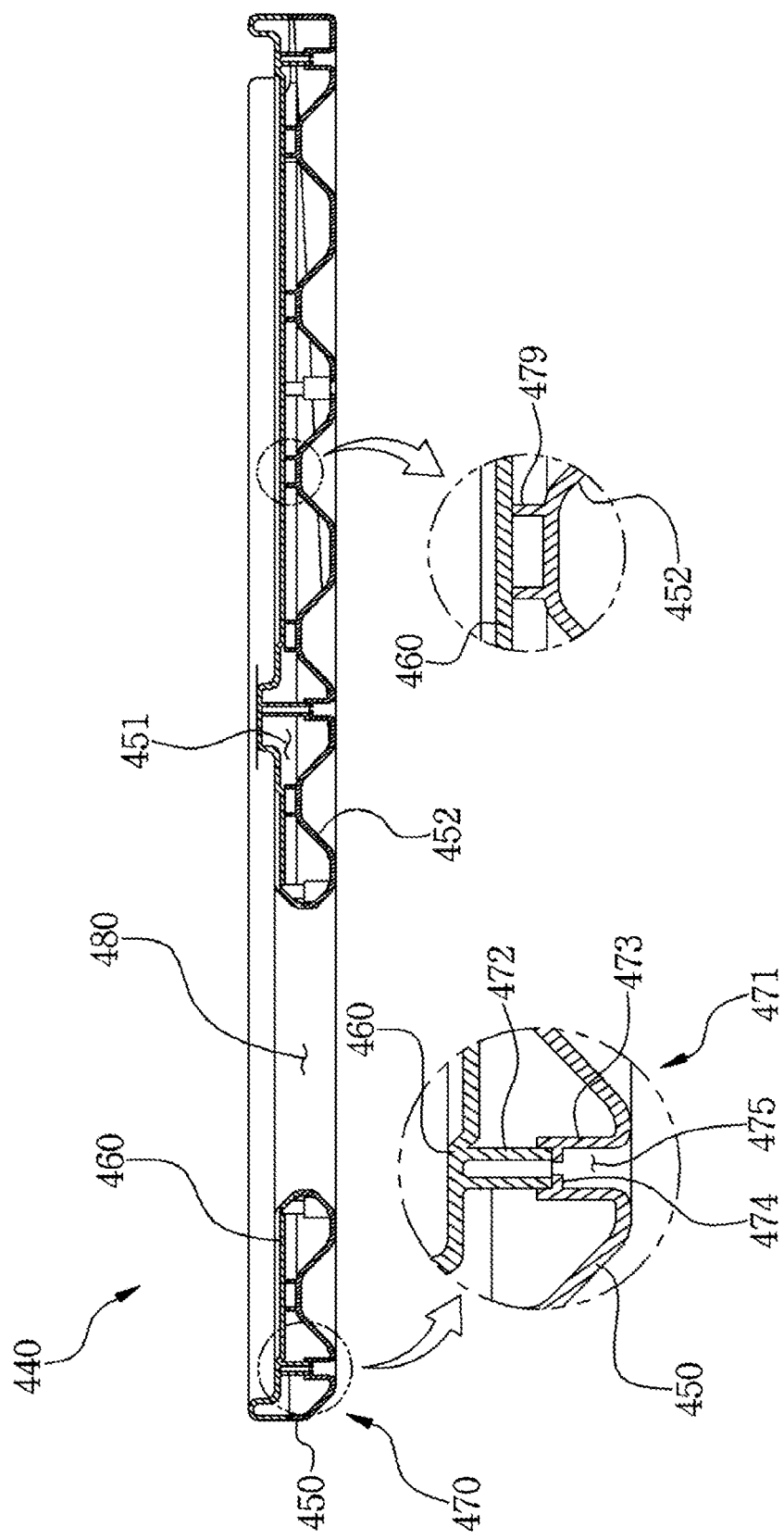
FIG. 7 is a cross-sectional view illustrating the work support of the up-down worktable of FIG. 1.

Meanwhile, when the object 10 is completely transferred, as shown in FIG. 5, the worker pivots the pivoting frame 430 upward to allow the work support 400 to stand straight with respect to the base frame 200. Here, since a top corner of a rear end is curved, the pivoting frame 430 easily pivots. Here, since the pivoting hole 431 extends in the extension direction of the pivoting frame 430, as shown in FIG. 6, the pivoting frame 430 moves downward and the first interference surface 432 of the pivoting frame 430 interferes with the interference block 601 so as to restrict pivoting of the pivoting frame 430. Accordingly, the work support maintains a state of standing straight with respect to the base frame 200. Since a plurality of up-down worktables 100 may be pressed in a front-rear direction to be stored while the work support stands straight, a larger number of up-down worktables 100 may be stored in a limited space.

In the up-down worktable 100 according to the present invention which is configured as described above, since the work support 400 automatically moves downward or upward during a loading or unloading process of the object 10, the worker keeps working at a uniform height so as to prevent a waist, knees, or the like of the worker from being damaged to improve work efficiency.

Figure 8:
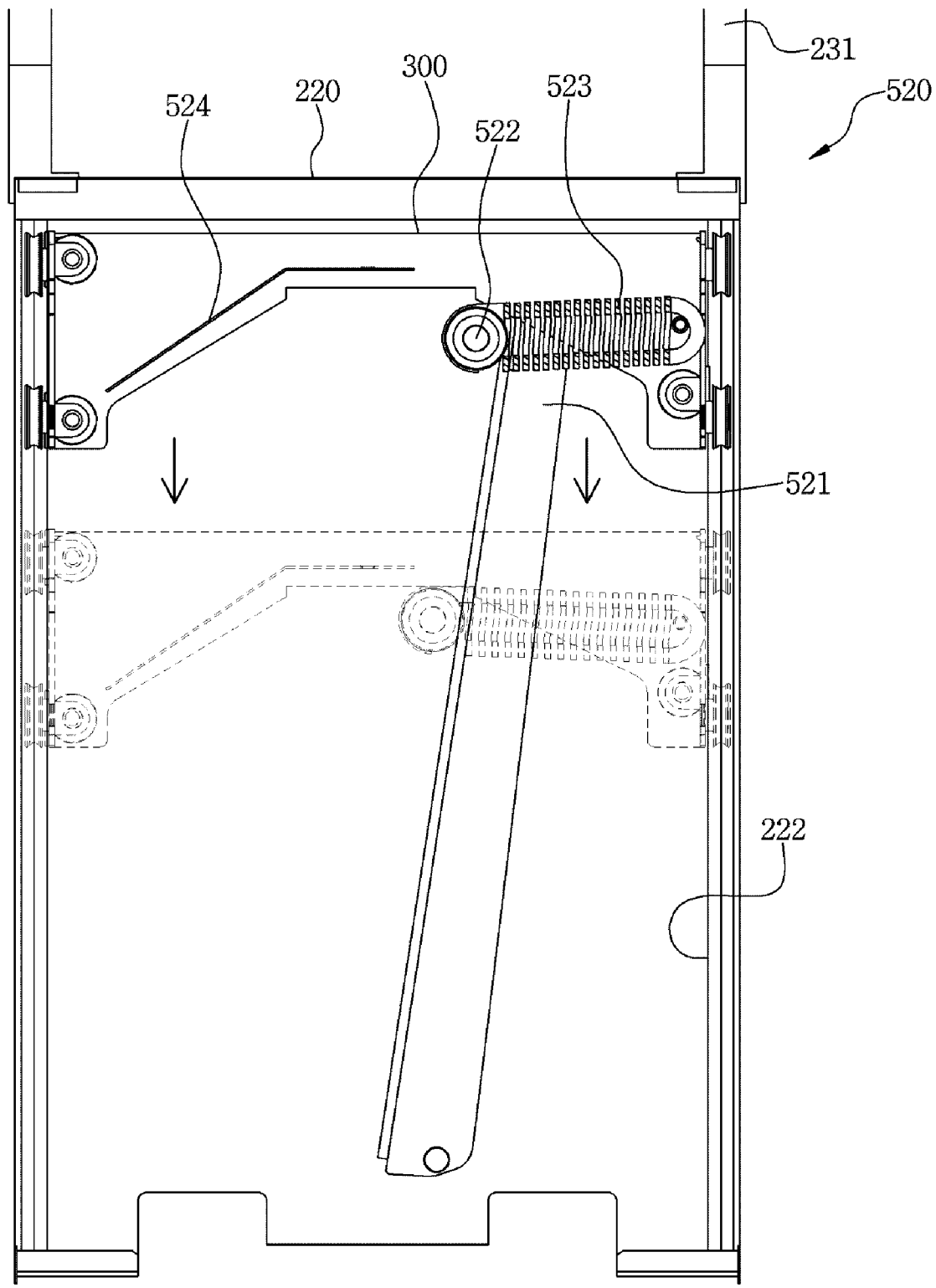
FIG. 8 is a cross-sectional view of an up-down worktable according to another embodiment of the present invention.

Meanwhile, FIG. 8 illustrates a lift support portion 520 according to another embodiment of the present invention.

Elements performing the same functions shown above in the drawings will be referred to as the same reference numerals.

Referring to the drawing, the lift support portion 520 includes an incline guide member 521 installed on the base frame 200 to be tilted at a certain angle with respect to a sliding path of the lifting member 300, a lifting roller 522 formed to be vertically movable along the incline guide member 521 and installed on the lifting member 300 to be slidable in a direction of intersecting with an extension direction of the incline guide member 521, and an elastic member 523 installed on the lifting roller 522 and configured to provide an elastic force along a sliding direction of the lifting roller 522 with respect to the lifting member 300 to allow the lifting roller 522 to move upward along the incline guide member 521.

The incline guide member 521 is installed in the support tower portion 220 and extends vertically. Here, the incline guide member 521 may be formed to be tilted so that a top end is located to be further rightward than a bottom end.

The lifting roller 522 is installed below the lifting member 300 to be slidable in a right-left direction while an outer circumferential surface thereof comes into contact with the incline guide member 521. Here, the lifting roller 522 may be installed on the lifting member 300 to be rotatable. Although not shown in the drawing, the lifting roller 522 is rotatably installed on the lifting member 300 at an end of a rotating shaft (not shown) configured to slide in a left-right direction.

Here, the lifting member 300 further includes a protection member 524 above the lifting roller 522 to protect the lifting roller 522. The protection member 524 protrudes from an inner surface of the lifting member 300 and extends with a certain length in a left-right direction. Also, the protection member 524 is formed to be bent to allow a left end to have a certain angle downward so as to prevent the lifting roller 522 from being separated from the lifting member 300.

The elastic member 523 has one end connected to the lifting roller 522 and the other end fixed to a right end of the lifting member 300 opposite to the lifting roller 522. As the elastic member 523, a tension spring provided with the coil wound spirally a plurality of times to form a hollow in a center thereof on the basis of a center of the hollow is applied.

When the object 10 is mounted on the mounting surface 405 of the work support 400, the lifting member 300 moves downward due to the load of the object 10. Here, due to downward movement of the lifting member 300, the lifting roller 522 moves along the incline guide member 521 and the elastic member 523 connected to the lifting roller 522 extends. Here, the work support 400 moves downward only at a certain distance due to the elastic force of the elastic member 523. Also, when the object 10 is moved from the work support 400, the elastic member 523 is compressed and the lifting roller 522 moves upward along the incline guide member 521 due to the elastic force of the elastic member 523 so that the lifting member 300 is located above the support tower portion 220.

Figure 9:
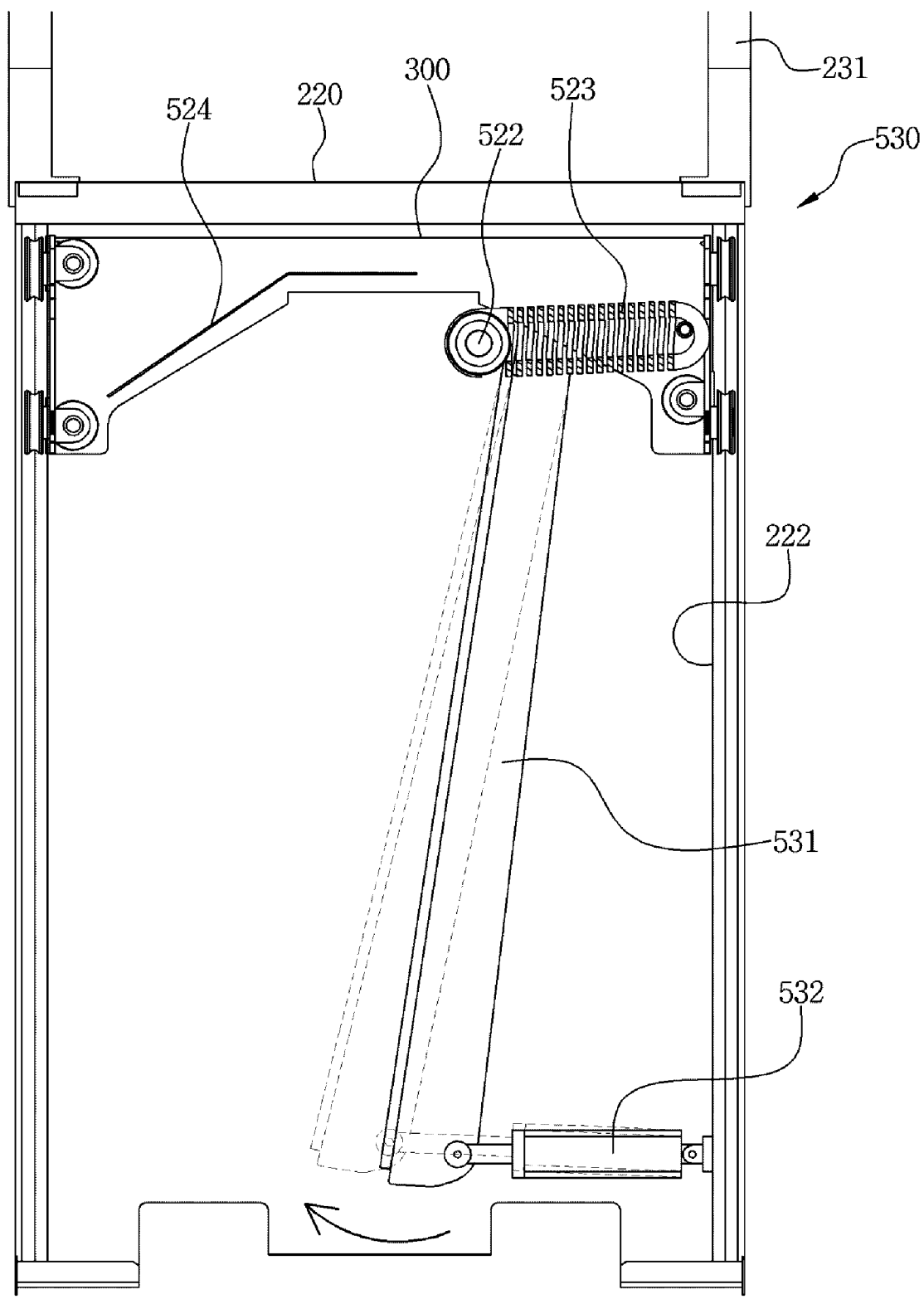
FIG. 9 is a cross-sectional view of an up-down worktable according to another embodiment of the present invention.

Meanwhile, FIG. 9 illustrates a lift support portion 530 according to another embodiment of the present invention.

Referring to the drawing, the incline guide member 531 is installed so that a top end is pivotable along the sliding direction of the lifting roller 522 with respect to the lifting member 300. The lift support portion 530 further includes an incline adjustment member 532 configured to pivot the incline guide member 531 to change a tilted angle of the incline guide member 531 with respect to a sliding path of the lifting member 300 so as to adjust a downward movement distance of the lifting member 300 with respect to the object 10 mounted on the mounting surface 405.

The incline guide member 531 is installed so that the top end is pivotable at a certain angle along a left-right direction and a bottom end is connected to the incline adjustment member 532.

The incline adjustment member 532 is installed in the support tower portion 220 while one end is pivotably installed on a right side of a bottom of the support tower portion 220 and the other end is pivotably installed at the bottom end of the incline guide member 531. An actuator with a length increased or decreased by a fluid pressure, air pressure, or electricity, which are applied from the outside, is applied to the incline adjustment member 532. The worker may adjust a tilted angle of the incline guide member 531 by manipulating the incline adjustment member 532. As the tilted angle of the corresponding incline guide member 531 increases, a tension length of the elastic member 523 with respect to downward movement of the lifting member 300 increases so that an elastic force applied to the lifting member 300 increases. Accordingly, a downward movement distance of the work support 400 with respect to the load of the object 10 may be adjusted by adjusting the tilted angle of the corresponding incline guide member 531.

Since a downward movement distance per unit load may be adjusted according to a type of an object to be worked by the lift support portion 530 configured as described above, there is an advantage of being applicable to a variety of products.

Figure 10:
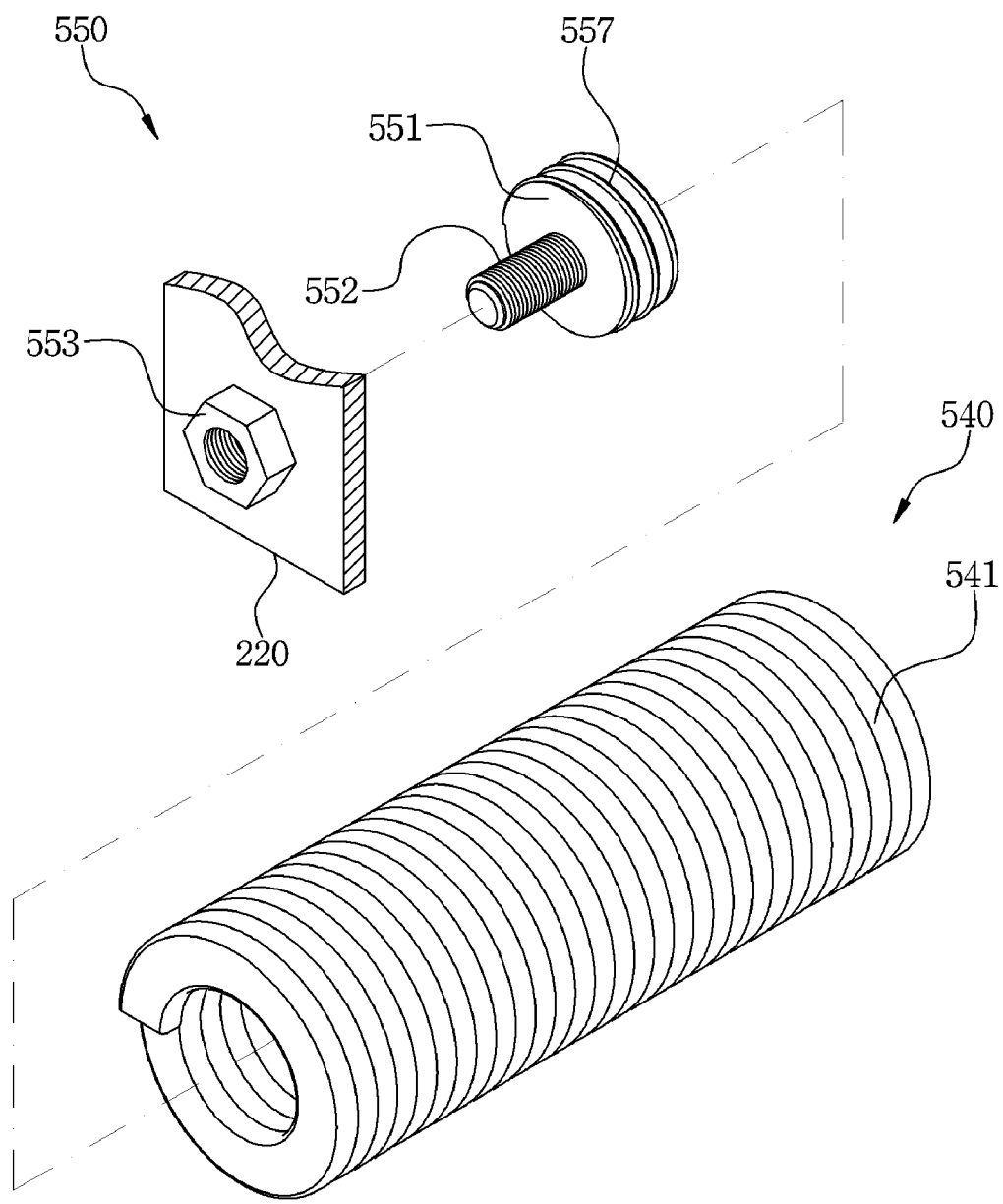
FIG. 10 is a perspective view of an elastic member of the up-down worktable according to another embodiment of the present invention.
Figure 11:
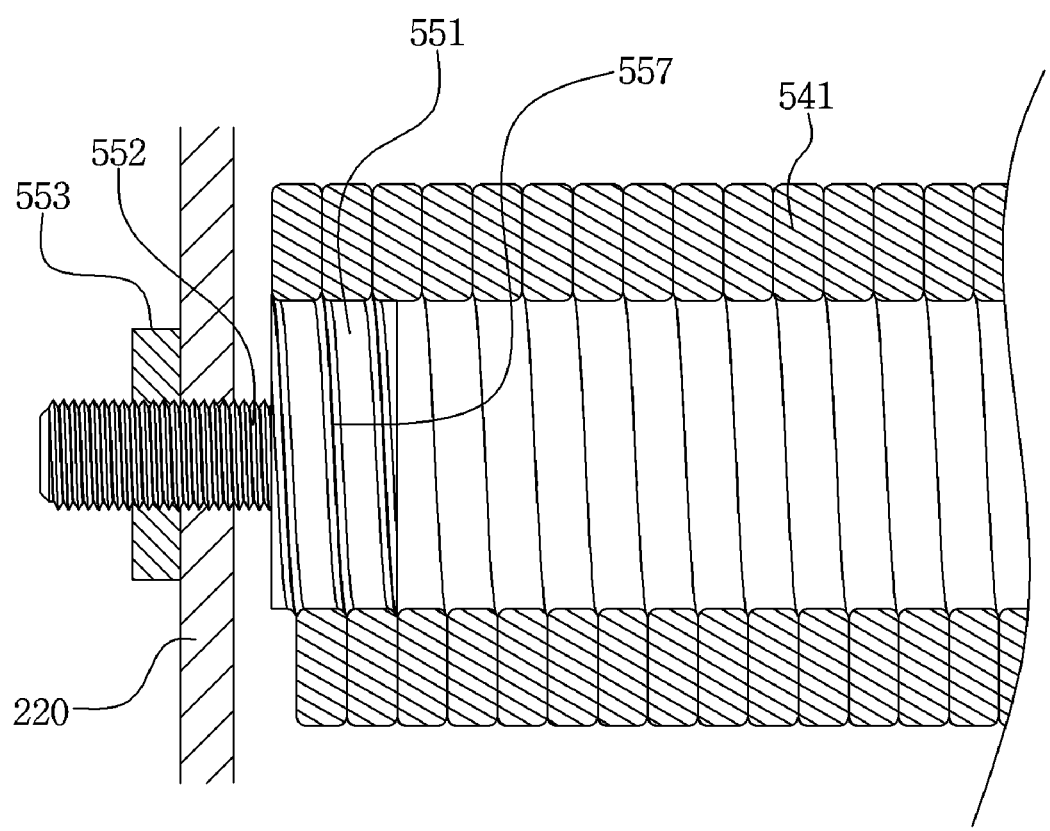
FIG. 11 is a cross-sectional view illustrating the elastic member of FIG. 10.

Meanwhile, FIGS. 10 and 11 illustrate an elastic member 540 according to another embodiment of the present invention.

Referring to the drawings, the elastic member 540 includes a coil 541 wound spirally a plurality of times and having a quadrangular section to form a hollow in a center thereof on the basis of a center of the hollow and a plurality of connection members 550 provided on both ends of the coil 541 to fix the both ends to the base frame 200 and the lifting member 300.

The connection member 550 includes an insertion body 551 inserted into the hollow of the coil 541 and having an outer circumferential surface fixed to an inner circumferential surface of the coil 541, a restriction rod 552 formed to extend and protrude from the insertion body 551 toward the outside of the coil 541, and a restriction body 553 configured to restrict an end of the restriction rod 552 to the base frame 200 or the lifting member 300.

The insertion body 551 is inserted into each of the ends of the coil 541 and has a cylindrical shape formed to have an outer diameter corresponding to an inner diameter of the coil 541. Here, an insertion protrusion 557 spirally protruding to be introduced between the coil 541 wound spirally is formed on an outer circumferential surface of the insertion body 551. When the insertion body 551 is inserted into the coil 541, the coil 542 is wound on the outer circumferential surface of the insertion body 551. Here, the insertion protrusion 557 is inserted between the wound coil 541 so that the insertion body 551 is more firmly fixed to the coil 541.

When the coil 541 is treated with heat while the insertion body 551 is inserted into the coil 541, the corresponding coil 541 contracts so as to reduce an inner diameter of the hollow and is fixed to the insertion body 551. Meanwhile, the insertion body 551 is not limited thereto and may be fixed to the corresponding coil 541 using a variety of methods such as welding fixation.

The restriction rod 552 extends with a certain length from the insertion body 551 to the outside of the coil 541 and has a screw thread formed on an outer circumferential surface to be screw-coupled to the restriction body 553. The restriction rod 552 may be formed in a central part of the insertion body 551. The restriction rod 552 is coupled to a wall surface of the support tower portion 220 or the lifting member 300 to pass therethrough.

The restriction body 553 includes a screw hole (not shown) formed in a rear surface thereof to be screw-coupled to an end of the restriction rod 552. The restriction body 553 is coupled to the end of the restriction rod 552 passing through the wall surface of the support tower portion 220 or the lifting member 300 to fix the corresponding restriction rod 552 to the support tower portion 552 or the lifting member 300. Here, in the shown example, the restriction body 553 may be installed to be fixed to the support tower portion 552 but is not limited thereto and may be separably coupled to the support tower portion 552.

Meanwhile, when the embodiments shown in FIGS. 8 and 9 are applied to the lift support portion, the restriction rod 552 is installed to pass through the lifting member 300 or a rotating shaft of the lifting roller 522 and the restriction body 553 is coupled to the end of the restriction rod 552 and restricts the corresponding restriction rod 552 to the lifting member 300 or the rotating shaft of the lifting roller 552.

Since the elastic member 540 is inserted into the coil 541 and fixedly welded and is connected to the base frame 200 or the lifting member 300 by a support pin 556 as described above, the coil 541 may be more firmly fixed to the base frame 200 or the lifting member 300.

Figure 12:
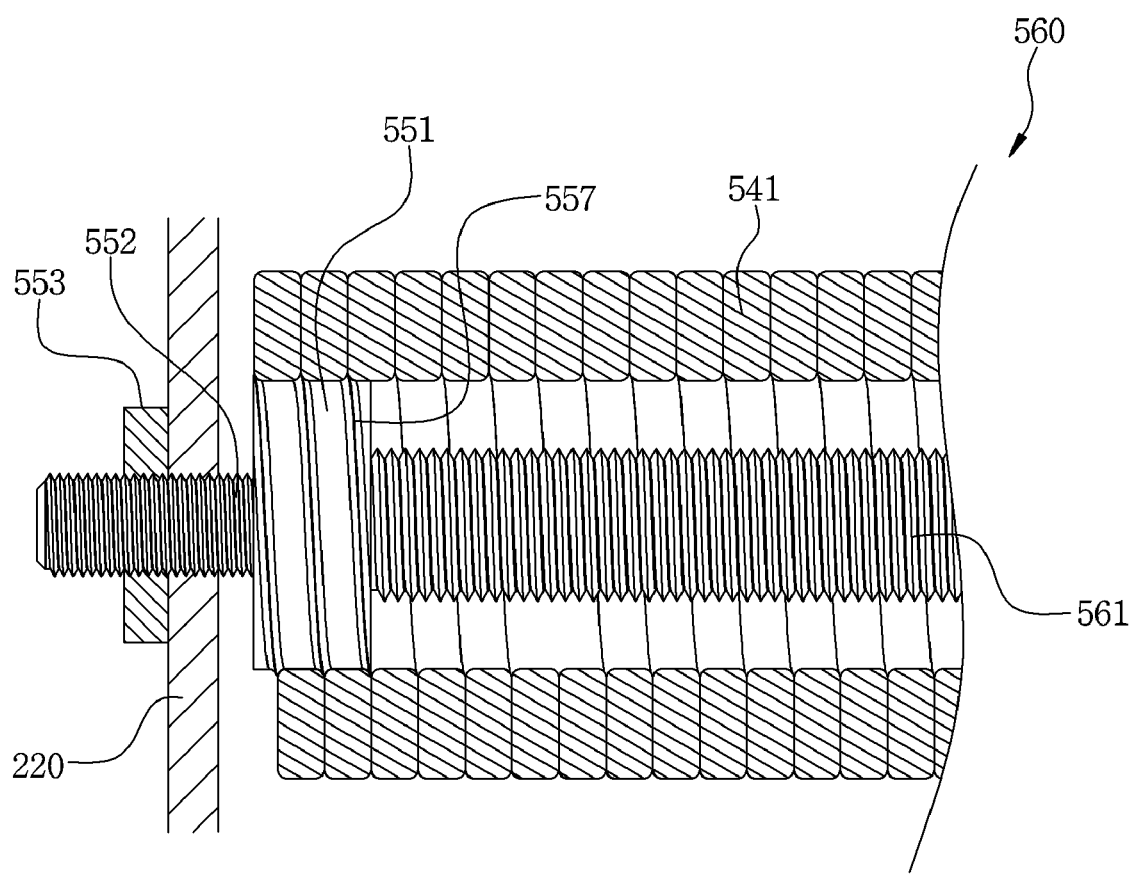
FIG. 12 is a cross-sectional view of an elastic member according to another embodiment of the present invention.

Meanwhile, FIG. 12 illustrates an elastic member 560 according to another embodiment of the present invention.

Referring to the drawing, the elastic member 560 further includes an insertion rod 561 extending with a certain length in a direction of being introduced from the insertion body 551 into the coil 541 to prevent the coil 541 from being bent by lifting of the lifting member 300.

The insertion rod 561 extends with a certain length from a central part of the insertion body 551 in a direction opposite to an extension member 554 so that an end is introduced into the coil 541. Even when the insertion rod 561 is introduced into the coil 541 so that an external force is applied to the coil 541, the coil 541 may be prevented from being bent so as to improve work reliability of the corresponding coil 541.

Figure 13:
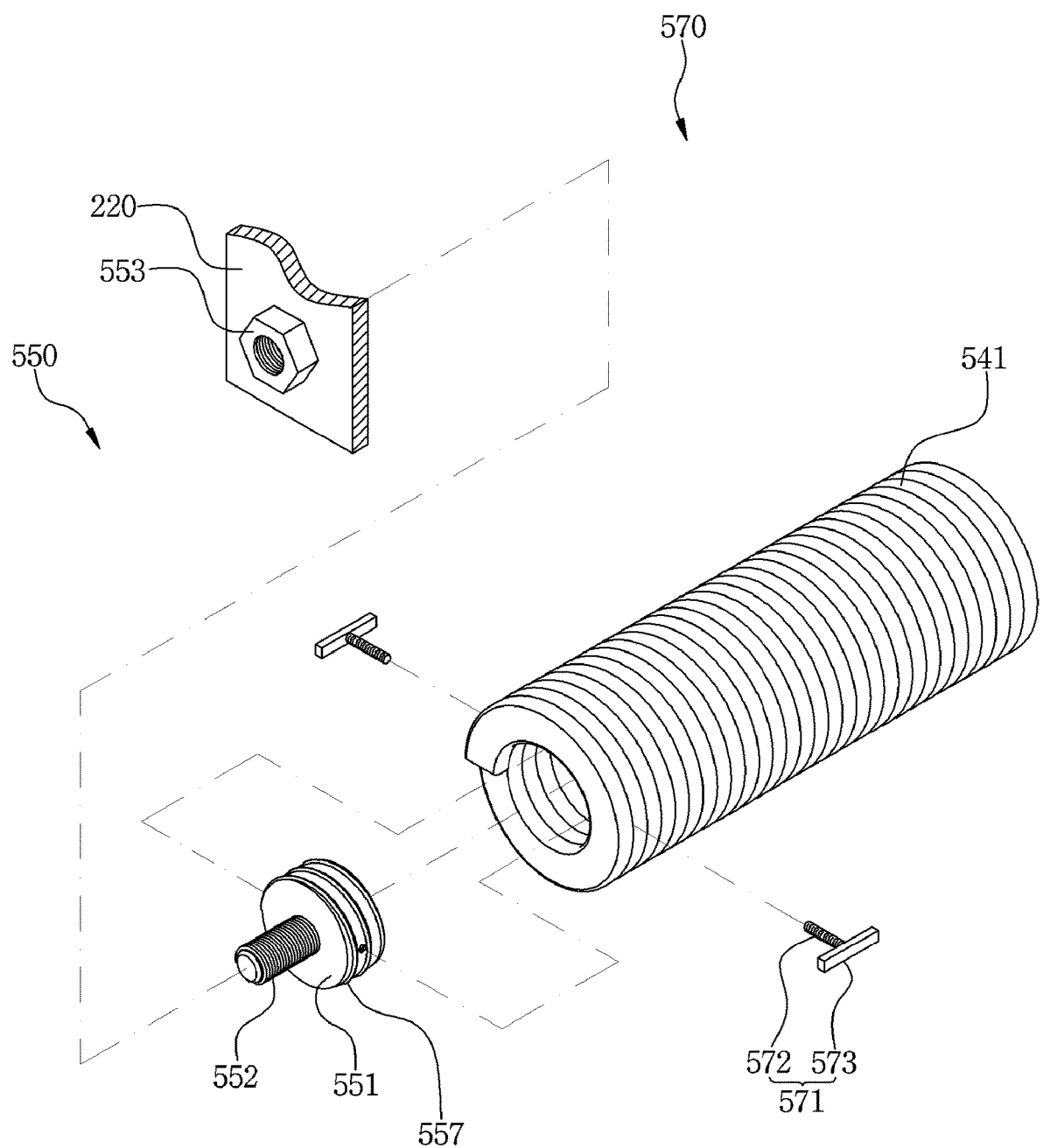
FIG. 13 is an exploded perspective view of an elastic member of an up-down worktable according to another embodiment of the present invention.

Meanwhile, FIG. 13 illustrates an elastic member 570 according to another embodiment of the present invention.

Referring to the drawing, the elastic member 570 includes a plurality of restriction units 571 configured to restrict the coil 541 to the insertion body 551.

The restriction unit 571 includes a coupling body 572 inserted between the coil 541 wound spirally in a radial direction of the hollow and coupled to the insertion body 551 and a contact block 573 formed to interfere with the outer circumferential surface of the coil 541.

The coupling body 572 has a screw thread on an outer circumferential surface to be screw-coupled to a screw hole formed in an outer circumferential surface of the insertion body 551 and extends with a certain length in the radial direction of the hollow of the coil 541. The coupling body 572 has one end inserted between the coil 541 wound spirally as shown in the drawing and is screw-coupled to the insertion body 551.

The contact block 573 is fixed to the other end of the coupling body 572 and extends in a direction of intersecting with an extension direction of the coupling body 572 so as to come into contact with the outer circumferential surface of the coil 541. The coupling body 572 may be coupled to be introduced into the insertion body 551 at a certain depth so that the contact block 573 is pressed against the outer circumferential surface of the coil 541.

Since the restriction unit 571 is installed in the insertion body 551 to restrict the corresponding coil 541 to the insertion body 551, the insertion body 551 may be more firmly fixed to the coil 541.

Figure 14:
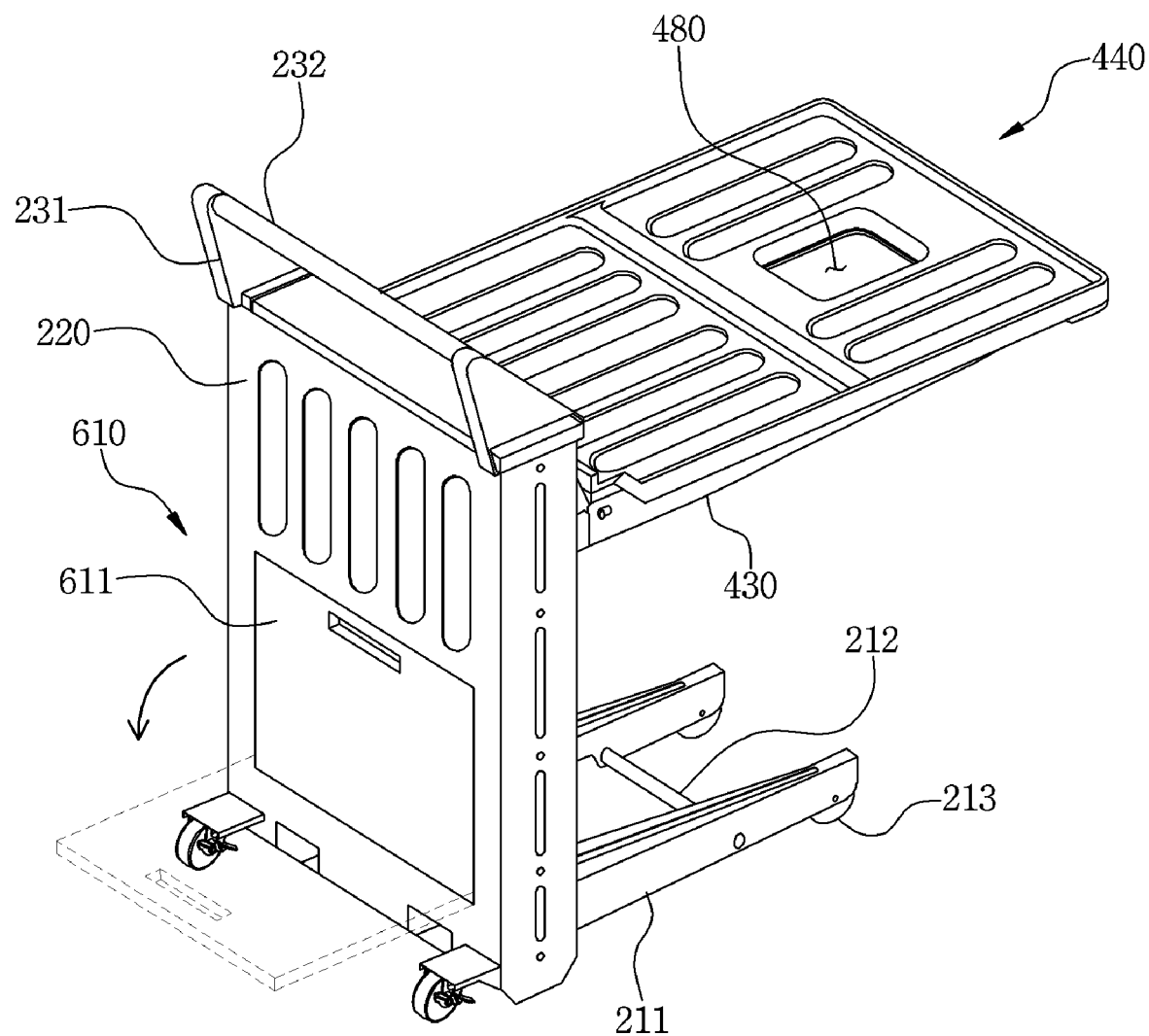
FIG. 14 is a perspective view of an up-down worktable according to another embodiment of the present invention.

Meanwhile, FIG. 14 illustrates a base frame 610 according to another embodiment of the present invention.

Referring to the drawing, instead of the holding ring 240, the base frame 610 further includes a support panel 611 having a bottom end pivotably installed in the rear of the support tower portion 220 to protrude from the support tower portion 220 to hold the transfer box 11 included in the object 10 and a pivoting support portion (not shown) configured to provide the support panel 611 with an elastic force so that a top end of the support panel 611 is pressed against the support tower portion 220.

The support panel 611 is formed to have a plate shape having a certain thickness and vertically extends with a certain length. The bottom end of the support panel 611 is pivotably installed at a bottom of a rear of the support tower portion 220. Here, a grip hole is formed in a top end of the support panel 611 to allow the worker to easily grip.

Although not shown in the drawing, a torsion spring installed on the pivoting shaft 420 of the support panel 611 is applied to the pivoting support portion to provide an elastic force so that the top end of the support panel 611 is pressed against the support tower portion 220 but the present invention is not limited thereto. Any elastic force providing device configured to provide the support panel 611 with an elastic force is applicable. The worker may pivot the top end of the support panel 611 downward and then stack and place the transfer boxes 11 above the support panel 611.

Figure 15:
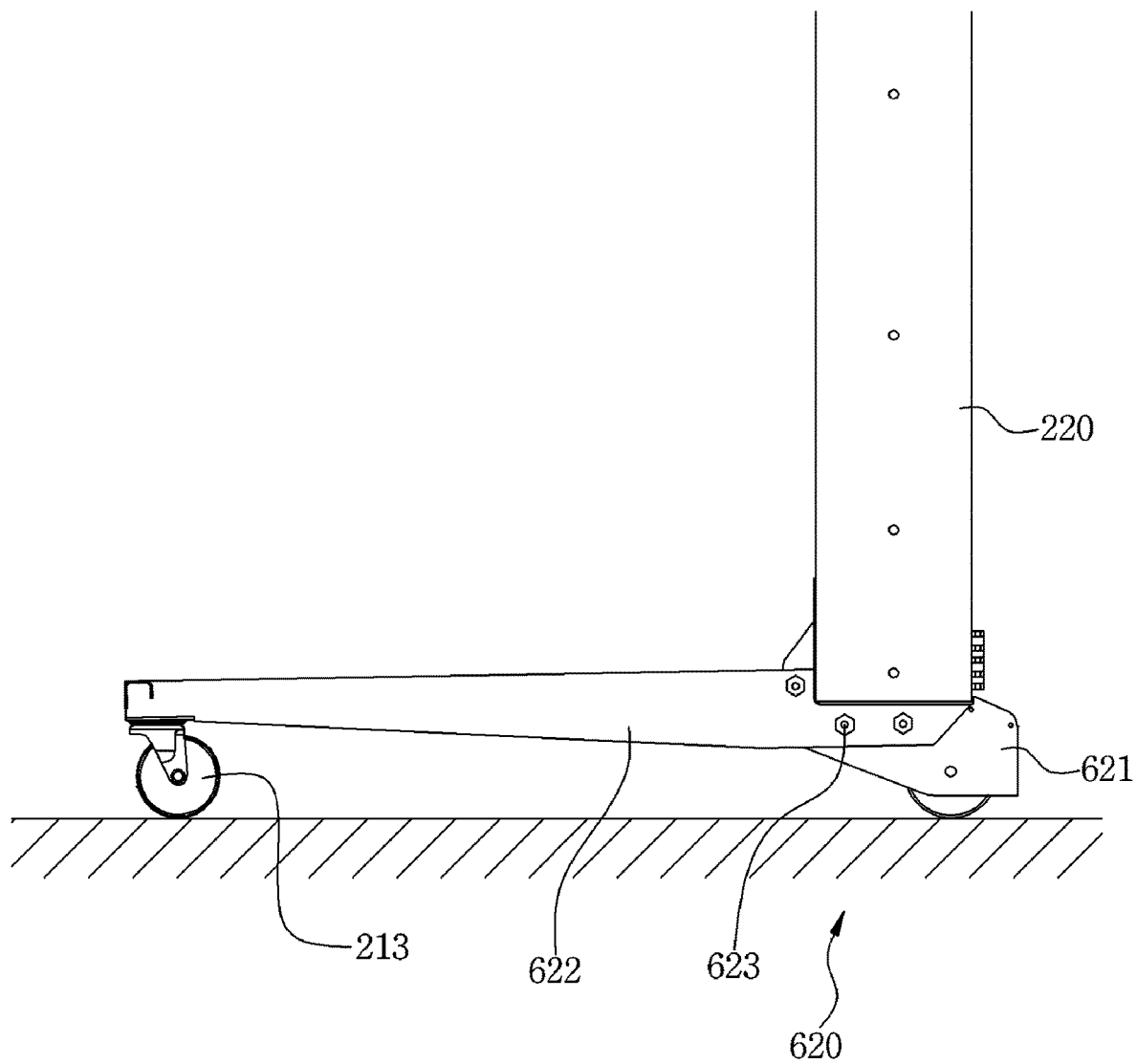
FIG. 15 is a side view of an up-down worktable according to another embodiment of the present invention.

Meanwhile, FIG. 15 illustrates an extension rod 620 according to another embodiment of the present invention.

Referring to the drawing, the extension rod 620 includes a base block 621 fixed to a bottom of the support tower portion 220, a separation member 622 separably coupled to the base block 621, and a fixing bolt 623 configured to fix the separation member 622 to the base block 621.

A plurality of such base blocks 621 are installed on a bottom surface of the support tower portion 220 to be spaced apart from each other along a left-right direction. The transfer wheel 213 is rotatably installed on a bottom surface of the base block 621. An insertion slot (not shown) is formed in a front end of the base block 621 to allow the separation member 622 to be inserted therein.

The separation member 622 is connected in a front-rear direction with a certain length, and a rear end is inserted into the insertion slot of the base block 621. The transfer wheels 213 are rotatably installed on a bottom surface of a front side of the separation member 622.

A plurality of such fixing bolts 623 pass through the base block 621 and are screw-coupled to a rear end of the separation member 622 so as to fix the separation member 622 to the base block 621. Meanwhile, when an error occurs with the separation member 622, after the fixing bolt 623 is separated from the base block 621 and the separation member 622, the separation member 622 is separated from the base block 621 and a new separation member 622 is coupled to the base block 621.

In the transfer portion 210 configured as described above, since the separation member 622 extending in a front-rear direction is separable from the base block 621, a volume may be reduced while being stored. Also, the separation member 622 which is damaged may be easily replaced.

According to the present invention, in an up-down worktable, since a work support automatically moves downward or upward during a loading or unloading process of an object to be transferred, a worker keeps working at a uniform height so as to prevent a waist, knees, or the like of the worker from being damaged to improve work efficiency.

The description of the disclosed embodiments is provided to allow one of ordinary skill in the art to utilize or perform the present invention. A variety of modifications of the embodiments are apparent to one of ordinary skill in the art, and general principles defined herein are applicable to other embodiments without departing from the scope of the present invention. Therefore, the present invention should not be limited to the embodiments provided herein and should be construed within the broadest scope consistent to the principles and novel features provided herein.

What is claimed is:

1. An up-down worktable comprising:
    a base frame;
    a lifting member installed on the base frame to be vertically slidable;
    a work support having one side surface provided with a mounting surface to allow an object to be transferred to be mounted thereon and having an end pivotably installed on the lifting member;
    a lift support portion installed on the base frame to move the lifting member upward while elastically supporting the lifting member to allow the lifting member to move downward according to a load of the object mounted on the mounting surface; and
    an angle restriction portion configured to restrict a pivoting angle of the work support so that the mounting surface is set in a direction of intersecting with a sliding direction of the lifting member to mount the object on the mounting surface or so that the work support stands straight with respect to the base frame,
    wherein the work support comprises:
    a bracket installed on the lifting member;
    a pivoting shaft formed on one end of the bracket;
    a pivoting frame extending in a direction away from the bracket and comprising a pivoting hole into which the pivoting shaft is inserted so that an end thereof is pivotably coupled to the bracket; and
    a support plate installed on the pivoting frame and provided with the mounting surface on one side surface thereof,
    wherein the pivoting frame comprises a first interference surface formed to extend along an extension direction of the pivoting frame and a second interference surface extending in a direction of intersecting with the first interference surface while a corner part between the first interference surface and the second interference surface is formed to be curved, wherein the pivoting hole is extended along the extension direction of the pivoting frame, and wherein the angle restriction portion comprises one or more interference blocks formed on respective brackets at positions separated from the pivoting shaft toward ends of the brackets so as to interfere with the first interference surface or the second interference surface of the pivoting frame and restrict pivoting of the pivoting frame.

2. The up-down worktable of claim 1, wherein the lift support portion comprises one or more elastic members having both ends installed on the lifting member and the base frame and configured to provide an elastic force to the lifting member to allow the lifting member to move upward.

3. The up-down worktable of claim 2, wherein the elastic member comprises:
   a coil wound spirally a plurality of times to form a hollow in a center thereof on the basis of a center of the hollow; and
   a plurality of connection members provided on both ends of the coil to fix the both ends to the base frame and the lifting member,
   wherein the coil is formed to have a quadrangular section.

4. The up-down worktable of claim 3, wherein the connection members each comprise:
   an insertion body inserted into the hollow of the coil, fixed to an inner circumferential surface of the coil, and having an outer circumferential surface on which an insertion protrusion spirally protruding to be introduced between the coil wound spirally is formed;
   a restriction rod formed to extend and protrude from the insertion body toward the outside of the coil; and
   a restriction body configured to restrict an end of the restriction rod to the base frame or the lifting member.

5. The up-down worktable of claim 1, wherein the lift support portion comprises:
   an incline guide member installed on the base frame to be tilted at a certain angle with respect to a sliding path of the lifting member;
   a lifting roller formed to be vertically movable along the incline guide member and installed on the lifting member to be slidable in a direction of intersecting with an extension direction of the incline guide member; and
   an elastic member installed on the lifting roller and configured to provide an elastic force along a sliding direction of the lifting roller with respect to the lifting member to allow a lifting roller shaft to move upward along the incline guide member,
   wherein the elastic member comprises:
   a coil wound spirally a plurality of times to form a hollow in a center thereof on the basis of a center of the hollow; and
   a plurality of connection members provided on both ends of the coil to fix the both ends to the lifting roller and the lifting member,
   wherein the coil is formed to have a quadrangular section, and
   wherein the connection members each comprise:
   an insertion body inserted into the hollow of the coil, fixed to an inner circumferential surface of the coil, and having an outer circumferential surface on which an insertion protrusion spirally protruding to be introduced between the coil wound spirally is formed;
   a restriction rod extending and protruding from the insertion body toward the outside of the coil; and
   a restriction body configured to restrict an end of the restriction rod to the lifting roller or the lifting member.

6. The up-down worktable of claim 1, wherein the work support comprises a monitoring hole formed to pass therethrough so as to allow a worker behind the work support to see a front side of the work support while the work support stands straight with respect to the base frame.

7. The up-down worktable of claim 1, wherein the base frame comprises:
   a transfer portion comprising a plurality of transfer wheels on a bottom thereof;
   a support tower portion extending upward from the transfer portion with a certain length, on which the lifting member is installed to be vertically slidable, and in front of which the work support is provided;
   a handle provided on the support tower portion to allow a worker to grip and move the transfer portion; and
   a holding ring installed on a rear side of the support tower portion and configured to hold a transfer box included in the object.

8. The up-down worktable of claim 1, wherein the support plate comprises:
   a support body having one side surface fixed to the pivoting frame, having an internal space formed therein, and having an open other surface;
   a support cover installed on the support body to cover the other surface of the support body and provided with the mounting surface on which transfer goods are mounted; and
   a reinforcing portion provided in the support body to reinforce the support body and the support cover,
   wherein the support body comprises a plurality of protruding portions formed on an inner surface opposite the support cover to protrude toward the support cover.

9. The up-down worktable of claim 8, wherein the reinforcing portion further comprises:
   at least one coupling protrusion formed on the support cover between the protruding portions to protrude toward the support body;
   an insertion body formed on the support body facing the coupling protrusion and comprising an insertion hole at an end to allow an end of the coupling protrusion to be inserted therein;
   a restriction protrusion formed to protrude from an inner surface of the insertion hole at a position receded from the end of the insertion body so as to restrict an insertion depth of the coupling protrusion with respect to the insertion hole; and
   a support protrusion formed on the protruding portion facing the support cover to protrude toward the support cover to support the support cover so as to prevent the support cover from being deformed by a load of the object mounted on the mounting surface.

* * * * *